US008239800B2

(12) United States Patent
Iyer et al.

(10) Patent No.: US 8,239,800 B2
(45) Date of Patent: Aug. 7, 2012

(54) METHOD AND APPARATUS FOR DETERMINING A ROBUSTNESS METRIC FOR A CIRCUIT DESIGN

(75) Inventors: Mahesh A. Iyer, Fremont, CA (US); Amir H. Mottaez, Los Altos, CA (US)

(73) Assignee: Synopsys, Inc., Mountain View, CA (US)

( * ) Notice: Subject to any disclaimer, the term of this patent is extended or adjusted under 35 U.S.C. 154(b) by 205 days.

(21) Appl. No.: 12/697,088

(22) Filed: Jan. 29, 2010

(65) Prior Publication Data

US 2011/0191732 A1   Aug. 4, 2011

(51) Int. Cl.
G06F 17/50 (2006.01)
G06F 9/455 (2006.01)
(52) U.S. Cl. ........ 716/113; 716/102; 716/104; 716/108; 716/111
(58) Field of Classification Search .................. 716/111, 716/113
See application file for complete search history.

(56) References Cited

U.S. PATENT DOCUMENTS

| 7,508,224 | B2* | 3/2009 | Williams | 324/707 |
| 7,689,957 | B2* | 3/2010 | Shenoy | 716/113 |
| 2008/0195984 | A1* | 8/2008 | Dougherty, et al. | 716/2 |
| 2008/0216036 | A1* | 9/2008 | Foreman et al. | 716/6 |
| 2009/0106722 | A1* | 4/2009 | Gregory et al. | 716/6 |
| 2010/0238884 | A1* | 9/2010 | Borran et al. | 370/329 |

* cited by examiner

Primary Examiner — Vuthe Siek
Assistant Examiner — Mohammed Alam
(74) Attorney, Agent, or Firm — Park, Vaughan, Fleming & Dowler LLP; Laxman Sahasrabuddhe

(57) ABSTRACT

Some embodiments provide techniques and systems for determining a change indicator for an endpoint, a pathgroup, a design, and/or a flow. The system can determine base critical path delays and base slacks for the endpoints in a base implementation of the circuit design. The system can then determine the new critical path delays and new slacks for the endpoints in a new implementation of the circuit design. Next, the system determines slack differences for the endpoints using the new slacks and the base slacks. Finally, for each endpoint, the system can determine an endpoint change indicator using the associated slack difference, the base critical path delay, and the new critical path delay. A pathgroup change indicator can be determined using endpoint change indicators. A design change indicator can be determined using pathgroup change indicators or scenario change indicators. A design flow change indicator can be determined using design change indicators.

25 Claims, 8 Drawing Sheets

METHOD AND APPARATUS FOR DETERMINING A ROBUSTNESS METRIC FOR A CIRCUIT DESIGN

BACKGROUND

1. Technical Field

The present disclosure relates to electronic design automation (EDA). More specifically, the present disclosure relates to methods and apparatuses for determining a robustness metric for a circuit design implementation.

2. Related Art

The slack at an endpoint of a circuit design implementation is equal to the difference between the arrival time and the required time at the endpoint. A slack is a violating slack if the slack value is less than a violation threshold. Of all the paths that end at the endpoint, the path with the worst slack is called the critical path for that endpoint.

Often times the RTL synthesis or place-and-route tool cannot meet the desired speed requirements as specified by the user, or the desired speed is not achievable. In these cases, the slack at the endpoint with the worst timing is a violating slack, and is known as the worst negative slack (WNS). The WNS is an important metric that is often used for comparing designs.

Note that violating slack values which are better than the WNS do not limit the speed at which the circuit can operate. However, these slack values can indicate the amount of work required for design closure (in terms of adjusting the floorplan, re-writing the RTL, adjusting the constraints, and so on). Further, these critical violating paths whose slacks are better than the WNS may become the worst critical paths at a later stage in the design flow because of modeling variability that is inherent in the design flow. A robust circuit design is one that is optimized for all violating paths.

The WNS is not a good indicator of the robustness of the circuit design. Some conventional approaches use the total negative slack (TNS) as an indicator of design robustness. TNS is computed by summing up the violating slacks at the endpoints of the design. Unfortunately, conventional TNS-based metrics are poor indicators of robustness. Specifically, some conventional approaches do not provide any indication of the magnitude of the change in the TNS. Other approaches provide the percentage change in the TNS value relative to the original TNS value. However, these approaches can produce highly misleading results.

Hence, what is needed are methods and apparatuses for computing a robustness metric for a circuit design.

SUMMARY

Some embodiments of the present invention provide techniques and systems for determining a change indicator (e.g., an indicator which indicates an improvement or degradation in design robustness) for a circuit design implementation. During operation, the system determines base critical path delays and base slacks for the endpoints of a base implementation of the circuit design. The system then determines the new critical path delays and new slacks for the endpoints of a new implementation of the circuit design. Next, the system determines slack differences for the endpoints using the new slacks and the base slacks. Finally, for each endpoint, the system can determine an endpoint change indicator using the associated slack difference, the base critical path delay, and the new critical path delay.

Note that the critical path for an endpoint can be different in the base implementation and in the new implementation. In some embodiments, the system can predict the delay that a critical path in the new implementation would have had in the base implementation. The system can determine the predicted delay of the critical path by adding the slack difference associated with an endpoint to the new critical path delay associated with that endpoint. Note that the predicted critical path delay is equal to the base critical path delay when the critical paths for the endpoint are the same in both the base implementation and the new implementation.

The system can then compare the predicted critical path delay with the base critical path delay. If the predicted critical path delay is greater than the base critical path delay, the system can determine the endpoint change indicator by dividing the slack difference by the average of the base critical path delay and the predicted critical path delay. On the other hand, if the predicted critical path delay is less than or equal to the base critical path delay, the system can determine the endpoint change indicator by dividing the slack difference by the base critical path delay.

The endpoints in a circuit design can be arbitrarily grouped into pathgroups. Specifically, an endpoint can be associated with one or more pathgroups. Conversely, a pathgroup can be associated with one or more endpoints. A pathgroup can enable a user to treat a group of paths as a single entity. Specifically, the user can request the system to generate reports on a per-pathgroup basis, and can instruct the system to perform optimization operations and/or other operations on a per-pathgroup basis.

The system can determine a pathgroup change indicator for a pathgroup by using the endpoint change indicators of the endpoints associated with the pathgroup. Specifically, a pathgroup change indicator can be the average of the endpoint change indicators of endpoints in that pathgroup.

The system can determine a design change indicator using the pathgroup change indicators. Specifically, a design change indicator can be the average of the pathgroup change indicators for a design implementation.

If the circuit design is being optimized for multi-mode multi-corner (MCMM) scenarios, the system can determine a scenario change indicator for an MCMM scenario by averaging pathgroup change indicators associated with the MCMM scenario. In this case, the design change indicator is determined by averaging the scenario change indicators.

The system can determine a flow change indicator to compare two design flows. In particular, a set of circuit designs can be used to compare the two design flows. Note that a design flow creates a specific implementation of a circuit design. The two design flows can be compared for robustness by comparing the design change indicators of each circuit design in the set of circuit designs for the two flows, and averaging the design change indicators.

Specifically, without loss of generality, one of the design flows can be called the base design flow, and the other design flow can be called the new design flow. The base design flow can be used to create a base implementation of a circuit design, and the new design flow can be used to create a new implementation of the circuit design. Then, as explained above, a design change indicator can be determined using the base implementation and the new implementation. Once the design change indicators have been computed for all circuit designs in the set of circuit designs, a flow change indicator can then be computed based on the design change indicators. Specifically, the flow change indicator can be an average of the design change indicators.

In some embodiments, the system can determine a robustness metric for an endpoint by dividing the endpoint's slack by the critical path delay associated with the endpoint. Alternatively, the system can divide the endpoint's slack by the sum of the slack and the critical path delay associated with the endpoint. The system can then determine the pathgroup's robustness metric by computing an average of the endpoint robustness metrics associated with the endpoints in the pathgroup. A design robustness metric can then be determined for a design implementation by computing an average of all pathgroup robustness metrics in that design implementation. If the design has multiple scenarios (multiple corners or modes), then the scenario robustness metric can be determined by computing the average of the robustness metric of all pathgroups in that scenario, and the design's robustness metric can be determined by computing an average of all scenario robustness metrics. Finally, a flow's robustness metric can be determined by computing an average of all design robustness metrics in the set of design implementations that were created using the flow.

Further, in some embodiments, the system can compare two design flows using a metric that is based on the number of violating endpoints. As before, the base design flow can be used to create a base implementation of a circuit design, and the new design flow can be used to create a new implementation of the circuit design. Then, the system can determine the difference between the total number of violating endpoints in all pathgroups in the base implementation, and the total number of violating endpoints in all pathgroups in the new implementation. Next, the system can divide this difference by the total number of violating endpoints or the total number of violating and non-violating endpoints in all pathgroups in the base implementation (or the new implementation). Note that the total number of violating and non-violating endpoints is the same in both the base implementation and the new implementation; however, the total number of violating endpoints can obviously be different in the base implementation and the new implementation. The system can then return the result of the division as the design change indicator. Once the design change indicators have been computed for all circuit designs in the set of circuit designs, a flow change indicator can then be computed based on the design change indicators. Specifically, the flow change indicator can be an average of the design change indicators.

The system can also determine a robustness metric for a design implementation based on the number of violating endpoints. Specifically, the system can determine the design robustness metric by dividing the total number of violating endpoints by the total number of violating and non-violating endpoints. As before, a flow's robustness metric can be determined by computing an average of all design robustness metrics in the set of design implementations that were created using the flow.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

Figure 1:
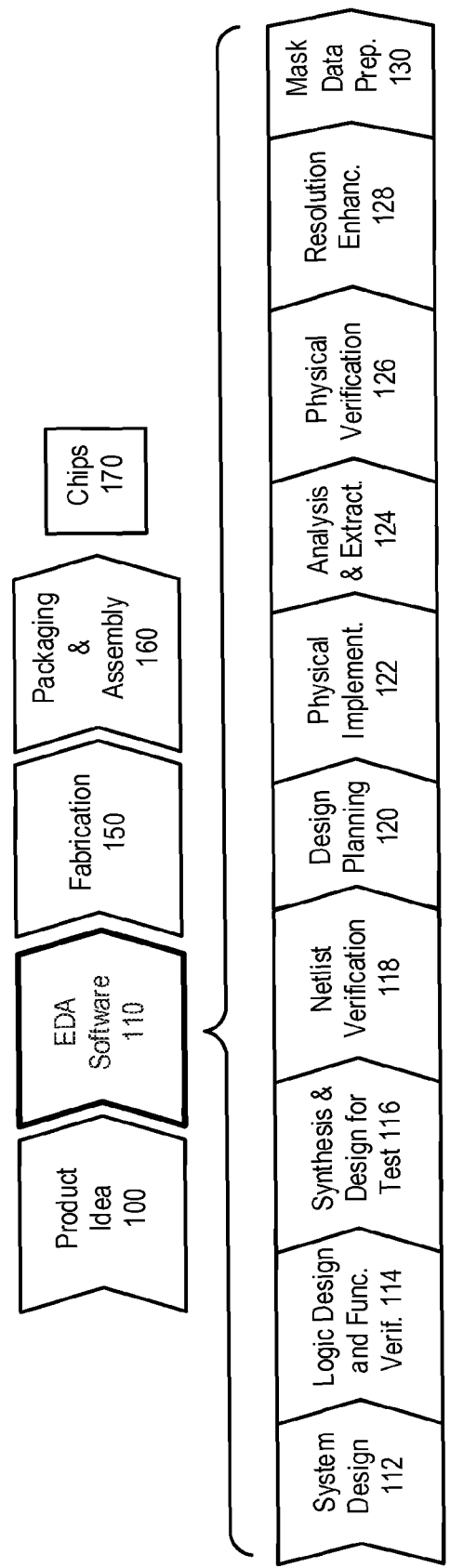
FIG. 1 illustrates various steps in the design and fabrication of integrated circuit.

FIG. 1 illustrates various steps in the design and fabrication of an integrated circuit. The process starts with a product idea 100, which is realized using Electronic Design Automation (EDA) software 110. Chips 170 can be produced from the finalized design by performing fabrication 150 and packaging and assembly 160 steps.

A design flow that uses EDA software 110 is described below. Note that the design flow description is for illustration purposes only, and is not intended to limit the present invention. For example, an actual integrated circuit design may require a designer to perform the design flow steps in a different sequence than the sequence described below.

In the system design step 112, the designers can describe the functionality to implement. They can also perform what-if planning to refine the functionality and to check costs. Further, hardware-software architecture partitioning can occur at this step. In the logic design and functional verification step 114, a VHDL or Verilog design can be created and checked for functional accuracy.

In the synthesis and design step 116, the VHDL/Verilog code can be translated to a netlist, which can be optimized for the target technology. Further, in this step, tests can be designed and implemented to check the finished chips. In the netlist verification step 118, the netlist can be checked for compliance with timing constraints and for correspondence with the VHDL/Verilog code.

In the design planning step 120, an overall floor plan for the chip can be constructed and analyzed for timing and top-level routing. Next, in the physical implementation step 122, placement and routing can be performed.

In the analysis and extraction step 124, the circuit functionality can be verified at a transistor level. In the physical verification step 126, the design can be checked to ensure correctness for manufacturing, electrical issues, lithographic issues, and circuitry.

In the resolution enhancement step 128, geometric manipulations can be performed on the layout to improve manufacturability of the design. Finally, in the mask data preparation step 130, the design can be taped-out for production of masks to produce finished chips.

Embodiments of the present invention can be used in one or more of the above-described steps.

An important performance metric for a circuit is the clock frequency at which the circuit can reliably operate. Static timing analysis (STA) is an invaluable tool for determining whether a circuit will reliably operate at a given clock frequency. Since STA uses an approximate model for the circuit, even if STA concludes that a circuit will reliably operate at a particular clock frequency, the circuit may fail to do so. Nevertheless, STA has emerged as the method of choice for verifying timing constraints for large integrated circuits because STA performs a reasonably accurate timing analysis within a reasonable amount of time.

In STA, the required times and arrival times are propagated through a graph-based representation of the circuit. Timing violations in the circuit can then be determined using the required times and the arrival times. Note that there are at least two types of timing violations: setup time violation and a hold time violation. In a setup time violation, a signal reaches a pin later than it is supposed to reach, e.g., a setup time violation may occur when a signal reaches a register input after the clock transition. In a hold time violation, a signal does not remain stable for a sufficient amount of time, e.g., a signal at a register's input may change before the register can capture the signal's value. General background information on static timing analysis and propagation of timing information can be found in Luciano Lavagno (Editor), Louis Scheffer (Editor), Grant Martin (Editor), *EDA for IC Implementation, Circuit Design, and Process Technology (Electronic Design Automation for Integrated Circuits Handbook)*, CRC Press, 1$^{st}$ Ed., March 2006.

Figure 2A:
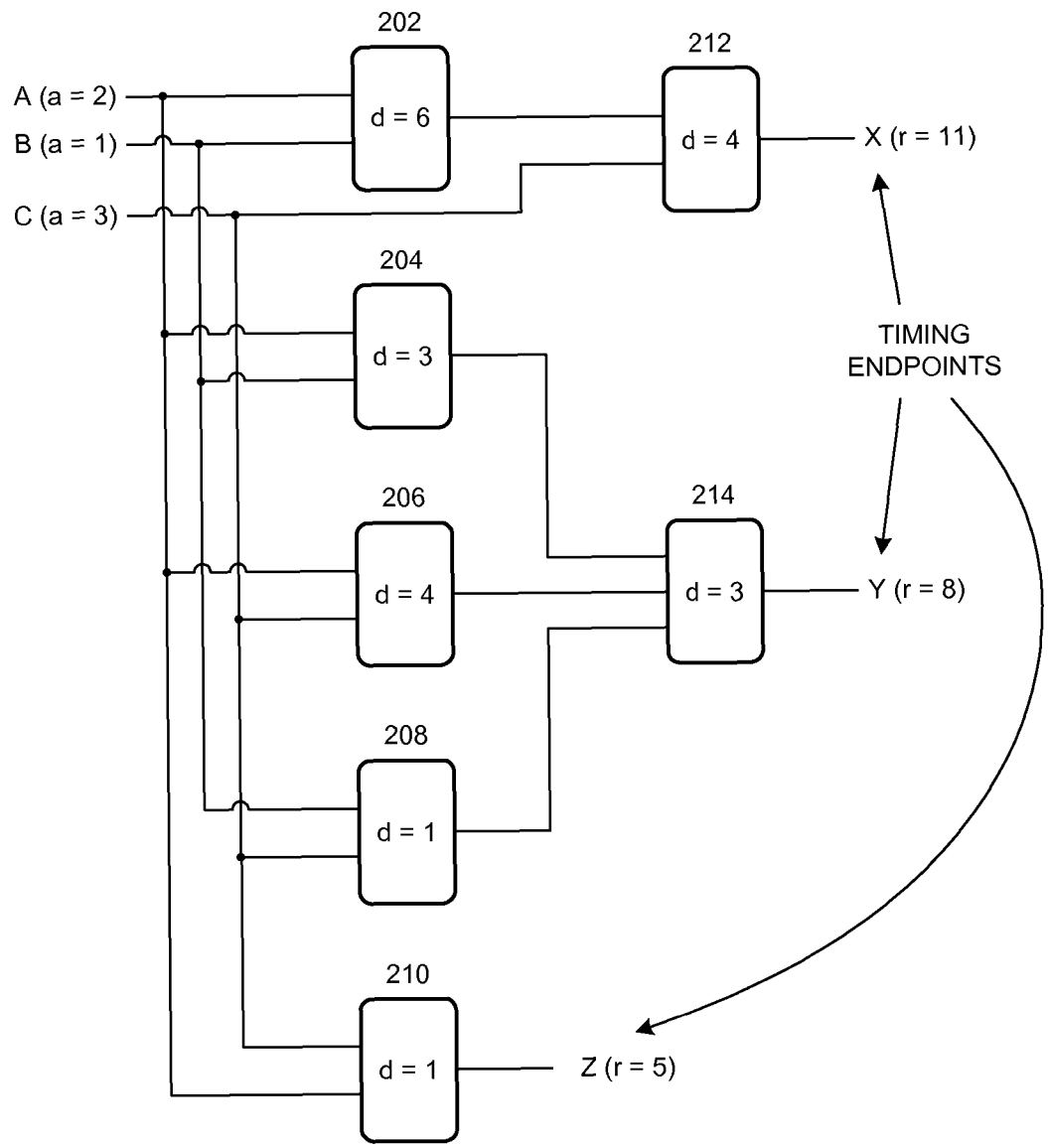
FIG. 2A illustrates a circuit with delay values, arrival times, and required times in accordance with some embodiments of the present invention.
Figure 2B:
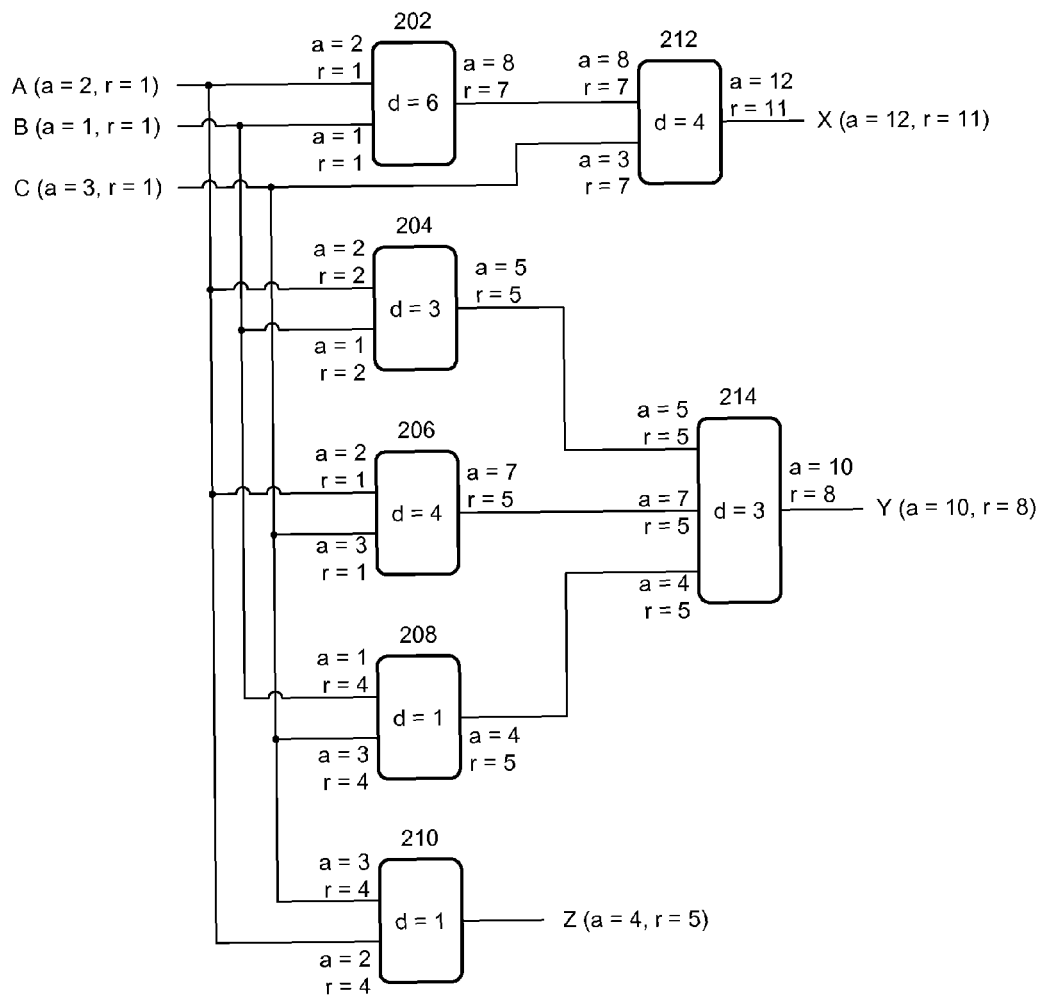
FIG. 2B illustrates the result of propagating arrival times in a forward direction (i.e., from inputs to outputs) and propagating required times in a backward direction (i.e., from outputs to inputs) through the circuit in accordance with some embodiments of the present invention.
Figure 2C:
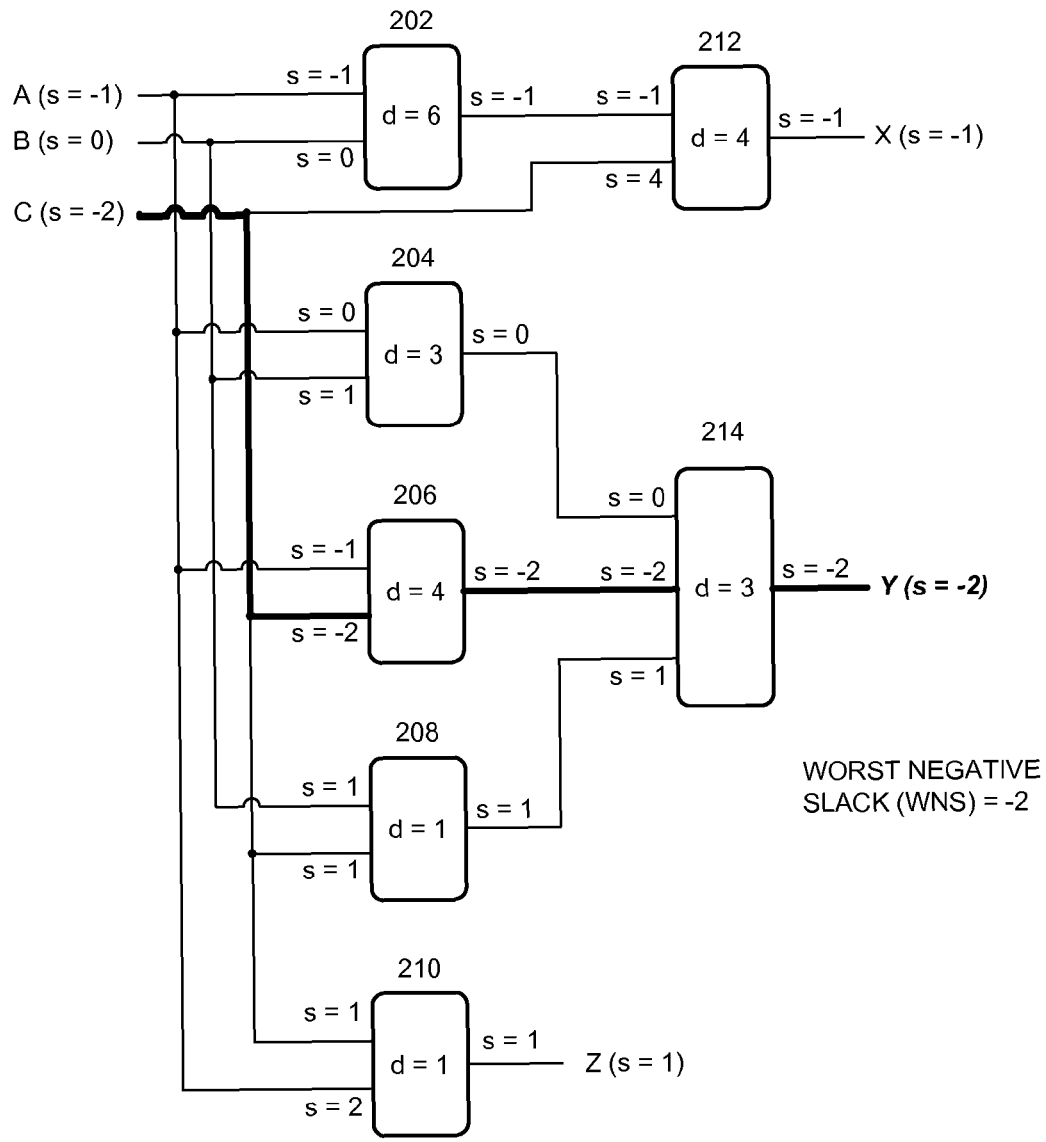
FIG. 2C illustrates how slack values can be determined in accordance with some embodiments of the present invention.

FIGS. 2A-2C illustrate how timing information can be propagated in a circuit in accordance with some embodiments of the present invention.

FIG. 2A illustrates a circuit with delay values, arrival times, and required times in accordance with some embodiments of the present invention.

Circuit 200 includes circuit blocks 202, 204, 206, 208, 210, 212, and 214. A circuit block can be an arbitrary portion of a circuit design. Specifically, a circuit block can include one or more cells and/or one or more gates. Circuit 200 has three primary inputs A, B, and C, and three primary outputs X, Y, and Z. The primary outputs X, Y, and Z are also called "timing endpoints" or "endpoints" for short. Note that a primary output can be an output of the circuit design, or an input of a register.

The delay for each circuit block is shown within the circuit block. For example, circuit block 202 includes text "d=6", which specifies that circuit block 202 has a delay of 6 time units (for example, if each time unit is equal to 5 ns, then a delay of 6 time units will be equal to 30 ns). A simplified delay model has been used in FIGS. 2A-2C for the sake of clarity and ease of discourse. A more complicated delay model can have different delay values for each input/output pair, considering output loading and input transition values. Further, the delay model can have different delay values for different rise and fall transition times. Additionally, the delay model may consider various forms of net (wire) delays and parasitic capacitances. Although FIGS. 2A-2C use a simplified delay model, it will be apparent to a person having ordinary skill in the art that techniques and systems described in this disclosure are readily applicable to more complicated delay models.

The arrival times at primary inputs are shown next to the primary inputs. For example, the text "a=2" appears next to primary input A, which indicates that the arrival time at primary input A is equal to 2 time units. The arrival time at a pin indicates when the signal arrives at the pin.

The required times at primary outputs are shown next to the primary outputs. For example, the text "r=11" appears next to primary output X, which indicates that the required time at primary output X is equal to 11 time units. The required time at a pin indicates when the signal is required to arrive at the pin.

FIG. 2B illustrates the result of propagating arrival times in a forward direction (i.e., from inputs to outputs) and propagating required times in a backward direction (i.e., from outputs to inputs) through the circuit in accordance with some embodiments of the present invention. At each circuit block, the worst-case arrival time is propagated forward. Similarly, the worst-case required time is propagated backwards. Note that the definition of "worst case" depends on whether the timing information is being propagated for determining setup violations or for determining hold violations. Specifically, in the case of setup violations, the maximum values are propagated, whereas in the case of hold violations, the minimum values are propagated.

The endpoints in a circuit design can be arbitrarily grouped into pathgroups. A pathgroup can be viewed as a tag that can be associated with one or more endpoints. The required times at an endpoint can be different for different pathgroups. Propagation of arrival times and required times can be performed for each pathgroup independently.

FIG. 2C illustrates how slack values can be determined in accordance with some embodiments of the present invention. At each pin, the arrival time is subtracted from the required time to obtain the slack value. For example, the slack value at the output of circuit block 202 is equal to −2 (6−8). Slack values for other pins can be determined in a similar fashion. Since an endpoint can have different required times for different pathgroups, it follows that an endpoint can have different slack values for different pathgroups.

The slack value indicates whether a timing constraint is being violated or not. Typically, a user can specify an acceptable slack value, that is, a slack threshold. If the slack value at a pin is less than this threshold, it implies that the pin has violated a timing constraint. Note that a user can use different thresholds for different parts of the circuit. Further, the definition of a violation can depend on the type of the constraint. For example, for one type of constraint, a violation may occur if the slack value is less than the threshold, whereas for another type of constraint, a violation may occur if the slack value is greater than the threshold.

The slack at the endpoints with the worst timing is known as the worst slack of the circuit. Often an RTL synthesis tool or place-and-route tool cannot meet the desired speed requirements specified by the user. As mentioned above, if the slack threshold is equal to zero, and if we are determining slack values that violate setup requirements, then the worst-case violating slack value is known as the worst negative slack (WNS). A path is a violating path if the slack at the path's endpoint is a violating slack.

The circuit 200 of FIG. 2C shows two endpoints, namely X and Y, with negative slack values: endpoint X has slack value −1 and endpoint Y has slack value −2. Endpoint Z, however, has a positive slack value of 1. In circuit 200 of FIG. 2C, the critical path for endpoint Y is shown in bold, tracing the path starting at primary input C through circuit block 206 and circuit block 214 to endpoint Y. Note that this slack value is also the WNS for the circuit. The path terminating at endpoint Z is not a violating path because its slack value is positive (in this example, we are assuming that a slack value is violating if it is negative).

The critical path length or the critical path delay of a critical path is the total delay along the critical path. The critical path delay can be determined by aggregating the delays along the critical path. For example, the critical path delay of the critical path between input C and output Y is 7 time units.

As mentioned above, TNS, which is computed by summing up the violating slacks at the endpoints of the design, is a poor indicator of robustness. Some conventional approaches do not provide any indication of the magnitude of the change in the TNS. Other approaches provide the percentage change in the TNS value relative to the original TNS value. Unfortunately, these approaches can produce highly misleading metrics. For example, very small TNS values of 0.001 (base implementation) and 0.002 (new implementation) produce a 100% change in TNS. However, this approach completely ignores the speed at which the circuit operates. Specifically, a TNS of 0.001 is negligible when the clock period is 10. On the other hand, this TNS is significant when the clock period is 0.001.

In contrast to conventional approaches, some embodiments of the present invention provide techniques and systems for determining a reliable and accurate change indicator (e.g., an indicator which indicates an improvement or degradation in design robustness) for a circuit design implementation.

Figure 3A:
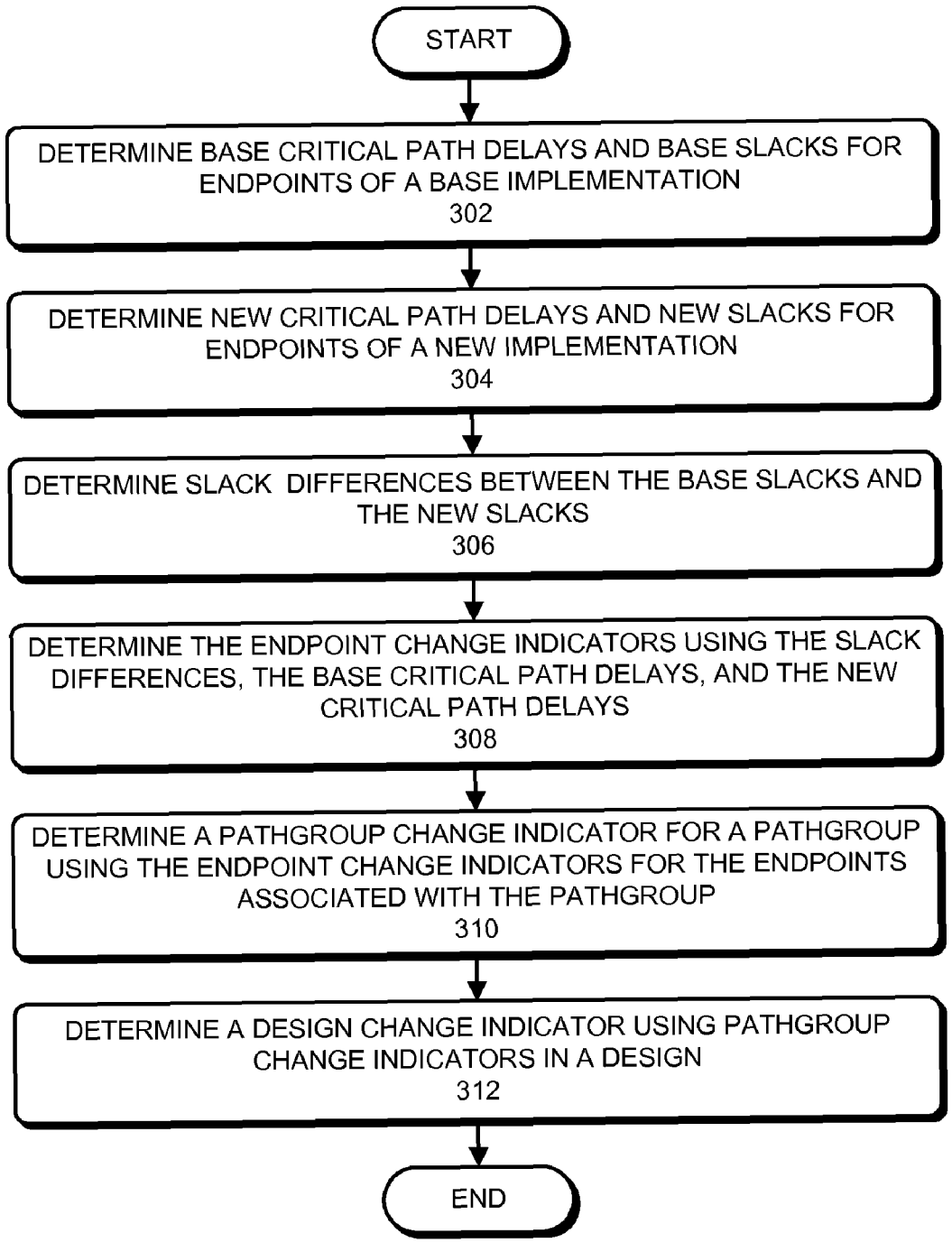
FIG. 3A presents a flowchart that illustrates a process for determining change indicators in accordance with some embodiments of the present invention.

FIG. 3A presents a flowchart that illustrates a process for determining change indicators in accordance with some embodiments of the present invention.

The process can begin by determining the base critical path delays and the base slack values for the endpoints of a base implementation (step 302). Next, the system can determine the new critical path delays and the new slack values for the endpoints of a new implementation (step 304). Note that the critical paths for an endpoint can be different in the base implementation and the new implementation. The system can then determine the slack differences between the base slacks and the new slacks (step 306). Next, the system can determine the endpoint change indicators using the slack differences, the base critical path delays, and the new critical path delays (step 308).

Let $L_b(e)$ be the critical path delay associated with endpoint e in the base implementation, $L_n(e)$ be the critical path delay associated with endpoint e in the new implementation, and $\delta(e)$ be the difference between the slack values at endpoint e, i.e., $\delta(e)=s_b(e)-s_n(e)$, where $s_b(e)$ is the slack value at endpoint e in the base implementation, and $s_n(e)$ is the slack value at endpoint e in the new implementation.

In some embodiments, the system uses different expressions for computing the endpoint change indicator based on whether $L_b(e)$ is greater than or less than $L_n(e)+\delta(e)$. Specifically, if $L_b(e) \geq L_n(e)+\delta(e)$, the endpoint change indicator I(e) for endpoint e can be computed as follows:

$$I(e) = \frac{\delta(e)}{L_b(e)} \times 100\%. \quad (1)$$

On the other hand, if $L_b(e)<L_n(e)+\delta(e)$, the endpoint change indicator I(e) for endpoint e can be computed as follows:

$$I(e) = \frac{\delta(e)}{(L_b(e) + (L_n(e) + \delta(e)))/2} \times 100\%. \quad (2)$$

The above expressions for computing the change indicator are not intended to limit the scope of the present invention. Many variations of the above expression will be apparent to a person having ordinary skill in the art.

An important insight that motivates the above equations is that the slack difference $\delta(e)$ needs to be viewed in the context of the critical path delay. For this reason, in Equation (1), the slack difference $\delta(e)$ is divided by the critical path delay $L_b(e)$. When $L_b(e)<L_n(e)+\delta(e)$, dividing the slack difference $\delta(e)$ by the critical path delay $L_b(e)$ may distort the change indicator's value. Hence, In Equation (2), the slack difference $\delta(e)$ is divided by an average of $L_b(e)$ and $L_n(e)+\delta(e)$ to mitigate the distortion.

The system can determine a pathgroup change indicator for a pathgroup using the endpoint change indicators for the endpoints associated with the pathgroup (step 310). Specifically, the pathgroup change indicator I(P) for pathgroup P can be the average of the endpoint change indicators for endpoints associated with pathgroup P.

Further, the system can determine a design change indicator using the pathgroup change indicators in a design (step 312). Specifically, the design change indicator I(D) for design D can be an average of the pathgroup change indicators in design D.

Figure 3B:
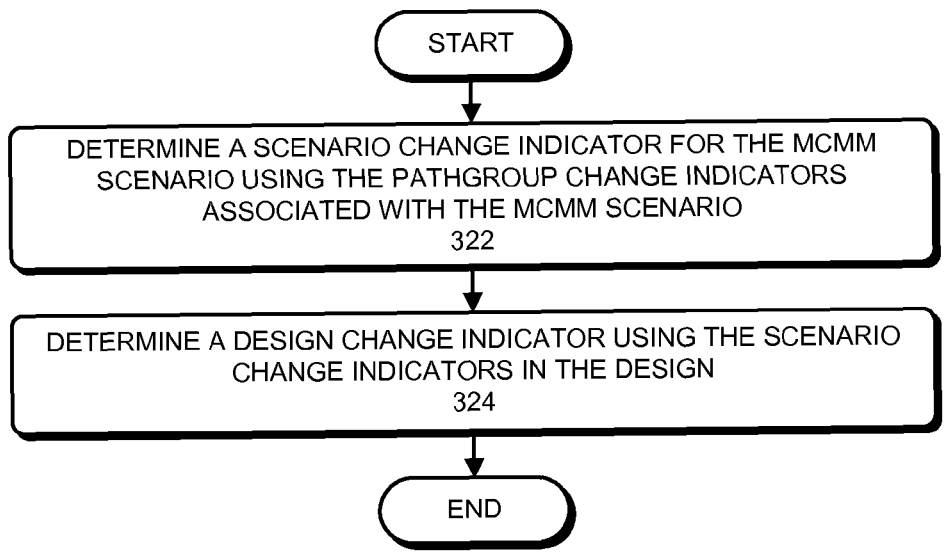
FIG. 3B presents a flowchart that illustrates a process for determining change indicators when the circuit design is being optimized for MCMM scenarios in accordance with an embodiment of the present invention.

FIG. 3B presents a flowchart that illustrates a process for determining change indicators when the circuit design is being optimized for MCMM scenarios in accordance with an embodiment of the present invention.

Advances to lower semiconductor geometries have increased the variability in process, voltage, and temperature. Implementation tools need to ensure that a design operates reliably (i.e., meets its functional and performance goals) under multiple process and operating corners. At the same time, increasing design complexity has introduced a large number of operational modes for a design (such as stand-by, mission, test, BIST, etc.). Hence, implementation tools also need to ensure that a design meets its desired performance objectives under all modes of operation. The number of modes and corners in a design continue to grow in each new semiconductor technology node and new design. The term "MCMM scenario" refers to a particular combination of a mode and a corner.

The system can determine pathgroup change indicators for an MCMM scenario using steps 302-310 shown in FIG. 3A. Next, the system can determine a scenario change indicator for the MCMM scenario using the pathgroup change indicators associated with the MCMM scenario (step 322). The system can then determine a design change indicator using the scenario change indicators in the design (step 324).

Figure 4:
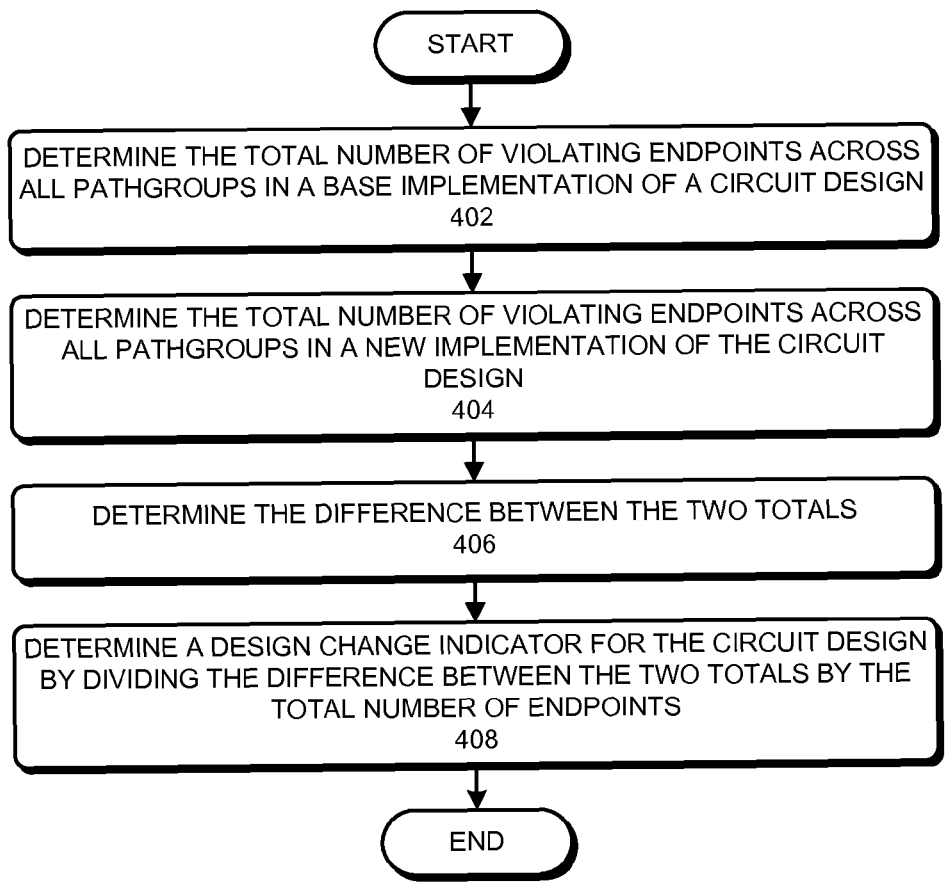
FIG. 4 presents a flowchart that illustrates a process for determining a design change indicator that is based on the number of violating endpoints in accordance with some embodiments of the present invention.

FIG. 4 presents a flowchart that illustrates a process for determining a design change indicator that is based on the number of violating endpoints in accordance with some embodiments of the present invention.

The process can begin by determining the total number of violating endpoints across all pathgroups in a base implementation of a circuit design (step 402). The system can then determine the total number of violating endpoints across all pathgroups in a new implementation of the circuit design (step 404). Next, the system can determine the difference between the two totals (step 406). Finally, the system can determine a design change indicator for the circuit design by dividing the difference between the two totals by the total number of endpoints (step 408).

Figure 5A:
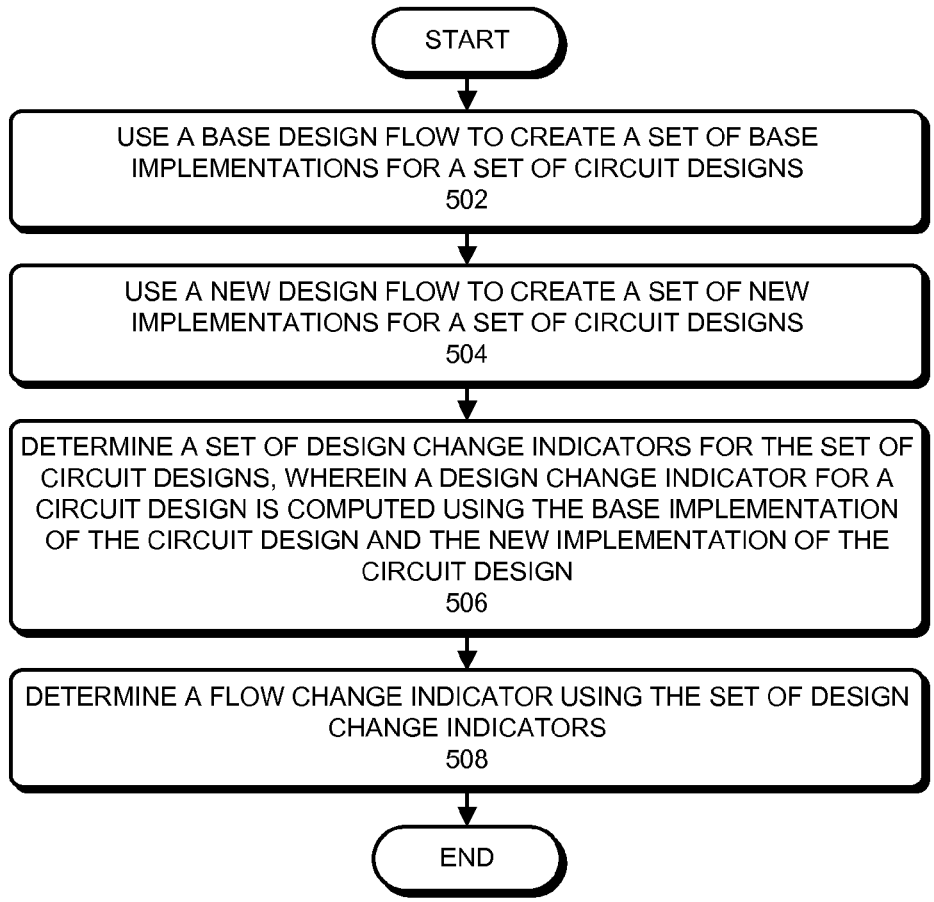
FIG. 5A presents a flowchart that illustrates a process for determining a flow change indicator in accordance with some embodiments of the present invention.

FIG. 5A presents a flowchart that illustrates a process for determining a flow change indicator in accordance with some embodiments of the present invention.

The process can begin by using a base design flow to create a set of base implementations for a set of circuit designs (step 502). Next, the system can use a new design flow to create a set of new implementations for the same set of circuit designs (step 504).

The system can then determine a set of design change indicators for the set of circuit designs, wherein a design change indicator for a circuit design is computed using the base implementation of the circuit design and the new implementation of the circuit design (step 506). Specifically, in some embodiments, the design change indicators can be determined using the process illustrated in FIG. 3. In other embodiments, the design change indicators can be determined using the process illustrated in FIG. 4.

Next, the system can determine a flow change indicator using the set of design change indicators (step 508). Specifically, the flow change indicator can be the average of the set of design change indicators.

Figure 5B:
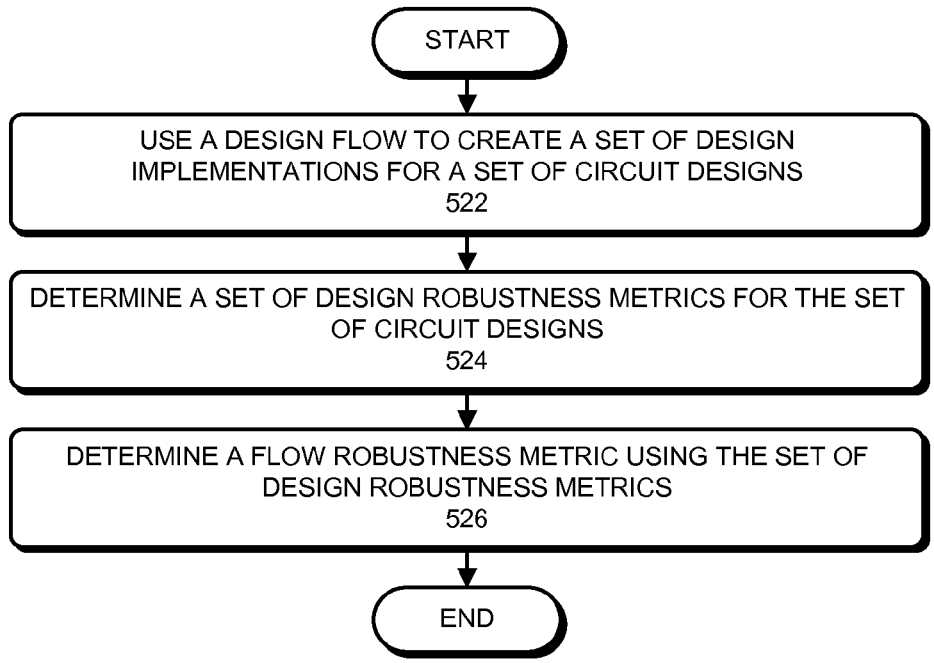
FIG. 5B presents a flowchart that illustrates a process for determining a robustness metric in accordance with an embodiment of the present invention.

FIG. 5B presents a flowchart that illustrates a process for determining a robustness metric in accordance with an embodiment of the present invention.

The system can use a design flow to create a set of design implementations for a set of circuit designs (step 522). Next, the system can determine a set of design robustness metrics for the set of circuit designs (step 524).

Note that there are at least two approaches for determining a design robustness metric: a slack based approach and a number of violating endpoints based approach.

In the slack based approach, the system can determine a robustness metric for an endpoint by dividing the endpoint's slack by the critical path delay associated with the endpoint. Alternatively, the system can divide the endpoint's slack by the sum of the slack and the critical path delay associated with the endpoint. The system can then determine the pathgroup's robustness metric by computing an average of the endpoint robustness metrics associated with the endpoints in the pathgroup. A design robustness metric can then be determined for a design implementation by computing an average of all pathgroup robustness metrics in that design implementation.

In the number of violating endpoints based approach, the system can determine the design robustness metric by dividing the total number of violating endpoints by the total number of violating and non-violating endpoints.

Once the set of design robustness metrics are determined for the set of circuit designs, the system can then determine a flow robustness metric using the set of design robustness metrics (step 526).

Figure 6:
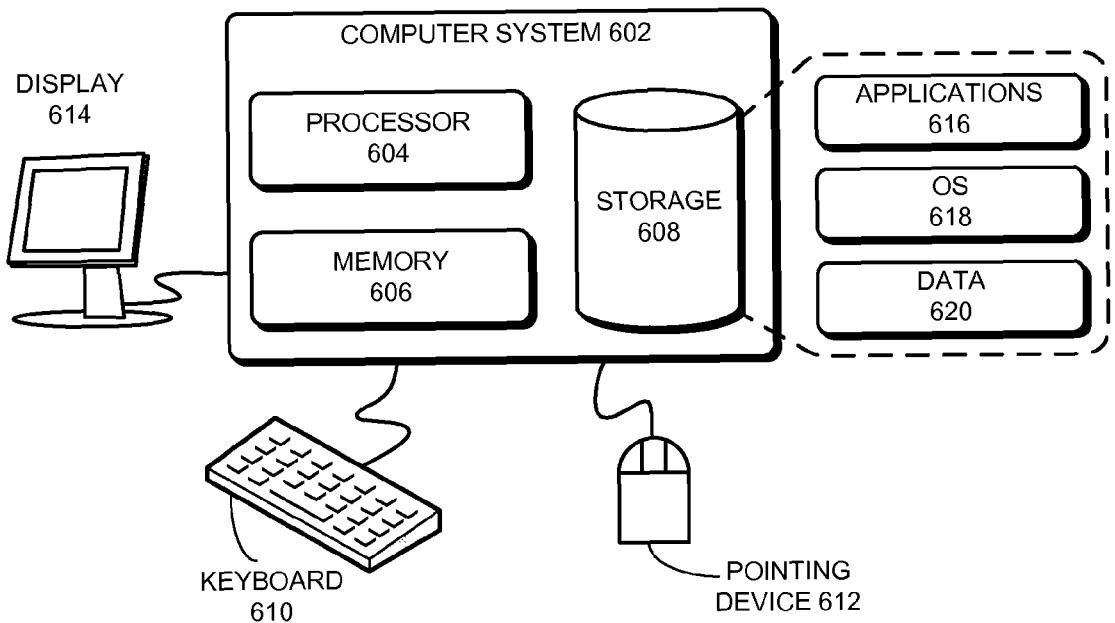
FIG. 6 illustrates a computer system in accordance with some embodiments of the present invention.

FIG. 6 illustrates a computer system in accordance with some embodiments of the present invention.

A computer or computer system can generally be any system that can perform computations. Specifically, a computer can be a microprocessor based system which may include multiple processing cores, a network processor based system, a digital signal processor based system, a portable computing device, a personal organizer, a distributed computing platform based system, or any other computing system now known or later developed.

Computer system 602 comprises processor 604, memory 606, and storage 608. Computer system 602 can be coupled with display 614, keyboard 610, and pointing device 612. Storage 608 can generally be any device that can store data. Specifically, a storage device can be a magnetic, an optical, or a magneto-optical storage device, or it can be based on flash memory and/or battery-backed up memory. Storage 608 can store applications 616, operating system 618, and data 620. Applications 616 can include instructions that when executed by computer 602 cause computer 602 to perform one or more processes described in this disclosure. Data 620 can include timing information, pathgroup information, change indicators, or any other data that is inputted or outputted by one or more processes described in this disclosure.

Figure 7:
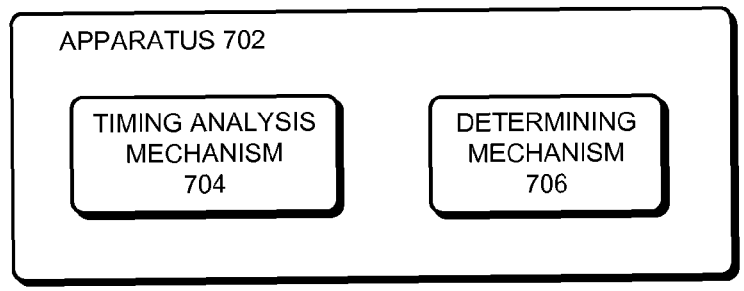
FIG. 7 illustrates an apparatus in accordance with some embodiments of the present invention.

FIG. 7 illustrates an apparatus in accordance with some embodiments of the present invention.

Apparatus 702 can comprise a number of mechanisms which may communicate with one another via a wired or wireless communication channel. Apparatus 702 may be realized using one or more integrated circuits. Apparatus 702 may be integrated with a computer system, or it may be realized as a separate device which is capable of communicating with other computer systems and/or devices. Specifically, apparatus 702 can comprise timing analysis mechanism 704 and determining mechanism 706.

In some embodiments, timing analysis mechanism 704 may be configured to determine base critical path delays and base slacks for endpoints of a base implementation of a circuit design. Further, timing analysis mechanism 704 may be configured to determine new critical path delays and new slacks for the endpoints of a new implementation of the circuit design. Additionally, timing analysis mechanism 704 may be configured to determine slack differences between the base slacks and the new slacks. Determining mechanism 706 may be configured to determine endpoint change indicators, pathgroup change indicators, design change indicators, and flow change indicators based on slack differences, the base critical path delays, and/or the new critical path delays.

In some embodiments, timing analysis mechanism 704 may be configured to determine the total number of violating endpoints over all pathgroups in a base implementation of a circuit design. Further, timing analysis mechanism 704 may be configured to determine the total number of violating endpoints over all pathgroups in a new implementation of the circuit design. Determining mechanism 706 may be configured to determine a design change indicator by dividing the difference between the two totals by the total number of endpoints in the circuit design. Determining mechanism 706 may be configured to determine a flow change indicator by computing an average of the design change indicators of a set of circuit designs.

CONCLUSION

The above description is presented to enable any person skilled in the art to make and use the embodiments. Various modifications to the disclosed embodiments will be readily apparent to those skilled in the art, and the general principles defined herein are applicable to other embodiments and applications without departing from the spirit and scope of the present disclosure. Thus, the present invention is not limited to the embodiments shown, but is to be accorded the widest scope consistent with the principles and features disclosed herein.

The data structures and code described in this disclosure can be partially or fully stored on a computer-readable storage medium and/or a hardware module and/or hardware apparatus. A computer-readable storage medium includes, but is not limited to, volatile memory, non-volatile memory, magnetic and optical storage devices such as disk drives, magnetic tape, CDs (compact discs), DVDs (digital versatile discs or digital video discs), or other media, now known or later developed, that are capable of storing code and/or data. Hardware modules or apparatuses described in this disclosure include, but are not limited to, application-specific integrated circuits (ASICs), field-programmable gate arrays (FPGAs), dedicated or shared processors, and/or other hardware modules or apparatuses now known or later developed.

The methods and processes described in this disclosure can be partially or fully embodied as code and/or data stored in a computer-readable storage medium or device, so that when a computer system reads and executes the code and/or data, the computer system performs the associated methods and processes. The methods and processes can also be partially or fully embodied in hardware modules or apparatuses, so that when the hardware modules or apparatuses are activated, they perform the associated methods and processes. Note that the methods and processes can be embodied using a combination of code, data, and hardware modules or apparatuses.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for determining a change indicator for a circuit design, the method comprising:
    determining base critical path delays and base slacks for endpoints in a base implementation of the circuit design;
    creating a new implementation of the circuit design from the base implementation of the circuit design using a design flow:
    determining new critical path delays and new slacks for the endpoints in the new implementation of the circuit design;
    determining slack differences between the base slacks and the new slacks;
    determining, by computer, endpoint change indicators using the slack differences, the base critical path delays, and the new critical path delays.

2. The method of claim 1, wherein determining endpoint change indicators includes:
    determining a predicted critical path delay for an endpoint by adding a slack difference associated with the endpoint to a new critical path delay associated with the endpoint;
    in response to determining that the predicted critical path delay is greater than a base critical path delay associated with the endpoint, determining an endpoint change indicator for the endpoint by dividing the slack difference by the average of the base critical path delay and the predicted critical path delay; and
    in response to determining that the predicted critical path delay is less than or equal to the base critical path delay, determining the endpoint change indicator by dividing the slack difference by the base critical path delay.

3. The method of claim 1, wherein the method further comprises:
    determining a pathgroup change indicator for a pathgroup using the endpoint change indicators for endpoints associated with the pathgroup.

4. The method of claim 3, wherein the pathgroup change indicator is an average of the endpoint change indicators.

5. The method of claim 3, wherein the method further comprises:

determining a design change indicator using pathgroup change indicators for pathgroups in the circuit design.

6. The method of claim 5, wherein the design change indicator is an average of the pathgroup change indicators.

7. The method of claim 5, wherein the method further comprises:
    determining a flow change indicator corresponding to the design flow using design change indicators.

8. The method of claim 7, wherein the flow change indicator is an average of the design change indicators.

9. The method of claim 1, wherein the method further comprises:
    determining a pathgroup change indicator for a pathgroup in a multi-corner multi-mode (MCMM) scenario using the endpoint change indicators in the MCMM scenario for endpoints associated with the pathgroup.

10. The method of claim 9, wherein the method further comprises:
    determining a scenario change indicator for the MCMM scenario using pathgroup change indicators for pathgroups in the circuit design.

11. The method of claim 10, wherein the method further comprises:
    determining a design change indicator using the scenario change indicators the circuit design.

12. The method of claim 11, wherein the method further comprises:
    determining a flow change indicator corresponding to the design flow using the design change indicators.

13. A non-transitory computer-readable storage medium storing instructions that when executed by a computer cause the computer to perform a method for determining a change indicator for a circuit design, the method comprising:
    determining base critical path delays and base slacks for endpoints in a base implementation of the circuit design;
    creating a new implementation of the circuit design from the base implementation of the circuit design using a design flow;
    determining new critical path delays and new slacks for the endpoints in the new implementation of the circuit design;
    determining slack differences between the base slacks and the new slacks;
    determining endpoint change indicators using the slack differences, the base critical path delays, and the new critical path delays.

14. The non-transitory computer-readable storage medium of claim 13, wherein determining endpoint change indicators includes:
    determining a predicted critical path delay for an endpoint by adding a slack difference associated with the endpoint to a new critical path delay associated with the endpoint;
    in response to determining that the predicted critical path delay is greater than a base critical path delay associated with the endpoint, determining an endpoint change indicator for the endpoint by dividing the slack difference by the average of the base critical path delay and the predicted critical path delay; and
    in response to determining that the predicted critical path delay is less than or equal to the base critical path delay, determining the endpoint change indicator by dividing the slack difference by the base critical path delay.

15. The non-transitory computer-readable storage medium of claim 13, wherein the method further comprises:

determining a pathgroup change indicator for a pathgroup using the endpoint change indicators for endpoints associated with the pathgroup.

16. The non-transitory computer-readable storage medium of claim 15, wherein the pathgroup change indicator is an average of the endpoint change indicators.

17. The non-transitory computer-readable storage medium of claim 15, further comprising:
   determining a design change indicator using pathgroup change indicators for pathgroups in the circuit design.

18. The non-transitory computer-readable storage medium of claim 17, wherein the design change indicator is an average of the pathgroup change indicators.

19. The non-transitory computer-readable storage medium of claim 17, further comprising:
   determining a flow change indicator using design change indicators.

20. The non-transitory computer-readable storage medium of claim 19, wherein the flow change indicator is an average of the design change indicators.

21. A method for determining a change indicator for a circuit design, the method comprising:
   creating a new implementation of the circuit design from a base implementation of the circuit design using a design flow;
   determining a difference between the total number of violating endpoints over all pathgroups in a base implementation of the circuit design and the total number of violating endpoints over all pathgroups in a new implementation of the circuit design; and
   determining, by computer, a design change indicator for the circuit design by dividing the difference by the total number of endpoints in the circuit design.

22. The method of claim 18, further comprising determining a flow change indicator by computing an average of design change indicators for a set of circuit designs.

23. A method for determining a robustness metric, the method comprising:
   determining, by computer, critical path delays and slacks for endpoints in an implementation of a circuit design;
   determining endpoint robustness metrics for the endpoints using the slacks and the critical path delays associated with the endpoints;
   determining pathgroup robustness metrics for pathgroups using the endpoint robustness metrics for endpoints associated with the pathgroups; and
   determining a design robustness metric for the circuit design using the pathgroup robustness metrics in the circuit design.

24. The method of claim 23, wherein the method further comprises determining a flow robustness metric for a design flow using design robustness metrics for a set of design implementations that were created using the design flow.

25. A method for determining a robustness metric, the method comprising:
   creating, by computer, a set of design implementations for a circuit design using a design flow;
   for each design implementation in the set of design implementations, determining a design robustness metric by dividing the number of violating endpoints in the design implementation by the total number of endpoints in the design implementation; and
   determining a flow robustness metric using the design robustness metrics.

* * * * *